United States Patent Office 3,519,605
Patented July 7, 1970

3,519,605
POLYORTHOCARBONATE POLYMERS AND COPOLYMERS AND METHOD OF PREPARING SAME
Tohru Takekoshi, Schenectady, N.Y., assignor to General Electric Company, a corporation of New York
No Drawing. Filed Mar. 4, 1968, Ser. No. 709,913
Int. Cl. C08g 17/13, 33/10, 17/14
U.S. Cl. 260—61                                    10 Claims

ABSTRACT OF THE DISCLOSURE

High molecular weight linear polyorthocarbonates are produced by reacting a dihalodiaryloxymethane with dihydroxy organic compounds in the presence of a hydrogen halide acceptor. Clear flexible films can be cast from solutions of these polyorthocarbonates, which films are useful as insulation for copper wires, as dielectric films in capacitor devices, etc.

---

This invention is concerned with novel polyorthocarbonate polymers and copolymers and with a method for producing these novel homopolymers and copolymers.

It has been discovered that dihalodiaryloxymethanes of the formula (I)
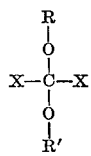

wherein R and R' are aryl groups selected from the class consisting of phenyl, naphthyl, biphenyl and halo (i.e. fluorine, chlorine, bromine or iodine) or alkyl-substituted phenyl, naphthyl and biphenyl groups wherein the alkyl group contains up to 12 carbon atoms and X is halogen selected from the class consisting of chlorine, bromine and iodine, can be reacted with a dihydroxy organic compound of the formula (II)                HO—R"—OH wherein R" is a divalent aliphatic organic group containing at least 2 carbon atoms or a divalent aromatic organic group, both groups being free of active hydrogens other than those associated with the two hydroxyl groups attached thereto, with the proviso that when R" is an aromatic group the hydroxyl groups are separated by at least 3 carbon atoms, in the presence of a hydrogen halide acceptor to produce homopolymers having the formula (III)
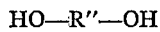

wherein R, R' and R" are above-defined and $x$ is an integer having a value of, for example, from 10 to 10,000 or higher. In Formula III R" need not represent the same entity throughout the polymer molecule, that is, R" can represent the same or different entities within its definition given above within the same polymer molecule.

It has also been found that copolymeric compositions of the formula (IV)
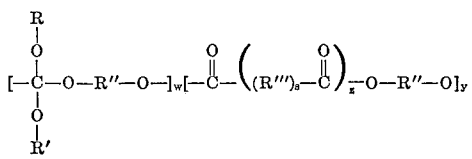

wherein R, R', R" are as above-defined and R''' is an alkylene or arylene group, $s$ is an integer of 0 or 1, $z$ is an integer of 0 or 1, $w$ and $y$ are each integers greater than 1 (e.g. 5 to 10,000 or more), are produced by substituting in the reaction described above for up to 95% of the dihalodiaryloxymethane of Formula I in the reaction process, a diacid halide of the formula (V)
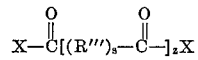

wherein R''', X, $z$ and $s$ are as above-defined and following the procedure set forth above.

The hydrogen halide acceptors which can be employed in the process of this invention are, for example, such inorganic compounds as calcium oxide, calcium carbonate, magnesium oxide, etc., and the organic tertiary amines and organic compounds containing a tertiary nitrogen which react as tertiary amines, such organic compounds include pyridine, trialkylamines, such as, trimethylamine, triethylamine, tripropylamine, tributylamine, dimethylpropylamine, dimethyl(phenylethyl)amine, benzylmethylethylamine, 1-dimethylamino-2 - phenylpropane, 1-dimethylamino-4-pentene, etc., and include cycloaliphatic tertiary amines, etc. Examples of the cyclic amines are pyridine and the alkyl substituted pyridines; alpha-, beta-, and gamma-collidine; alpha-, beta- and gamma-picoline; 2,4-lutidine, dipyridyls, N-alkylpyrroles, N-alkylpyrrolidines, N-alkylpiperidines, and N-alkyltriazoles, etc.

The amount of hydrogen halide acceptor employed in the process of this reaction should be sufficient to react with all of the hydrogen halide liberated by the reaction. It is preferred for completeness of reaction and ease of recovery of the reaction products to employ a 10 to 100% excess of the hydrogen halide acceptor over that required to react with all the hydrogen halide produced by the reaction.

Solvents which can be employed in the process of this invention are the aprotic type solvents and include, for example, the aromtaic hydrocarbon solvents such as benzene, toluene, xylene, etc.; the aliphatic hydrocarbon solvents such as pentane, hexane, cyclohexane, heptane, octane and the like; the chlorinated aromatic and aliphatic hydrocarbon solvents such as methylene chloride, chloroform, carbon tetrachloride, perchloroethylene, trichloroethylene, chlorobenzene, dichlorobenzene, etc.; ethers such as diethylether, dibutylether, dipropylether, dioxane, tetrahydrofurane, etc. The solvents should, of course, be anhydrous. The amount of solvent employed in the process of this invention is not critical and can range, by weight, from 10 to 1,000 parts of the solvent per 100 parts of the reactants of Formulas I, II and V. It is preferred for simplicity of operation and ease of recovery of the reaction product, to employ at least 100 parts, by weight, of the solvent per 100 parts, by weight, of the total weight of the reactants.

The temperature at which the process of the invention is conducted is not critical and is usually dependent upon the freezing point of the particular solvent employed. The temperature of the reaction can range from as low as 80° C. to as high as 150° C. or even higher. It is, of course, obvious to those skilled in the art that the reaction rate at the lower temperature will be slower whereas the reaction rates at the higher temperatures will be very rapid and difficult to control. The reaction is almost instantaneous and ordinarily takes place upon merely mixing the reactants at room or ambient temperatures.

The process of the invention can be operated at subatmospheric, atmospheric or superatmospheric pressure. For simplicity and ease of operation, it is preferred to conduct the processes of this invention at atmospheric pressure.

In order to obtain the highest possible molecular weights of the homopolymers and copolymers of this invention, the amount of the diaryloxydihalomethane of Formula I or diacid halide of Formula V should be adjusted so that the total number of moles of these materials is from 0.95 to 1.05 moles of these reactants per mole of dihydroxy compound of Formula II. If greater or lesser amounts are employed the molecular weight of the homopolymer or copolymer of Formula III or IV will, of course, be lower due to the end blocking effect of the excess reactant.

The monovalent aromatic radicals represented by R and R' are, for example, phenyl, naphthyl, biphenyl, phenoxyphenyl, etc., and alkyl-substituted groups for example, tolyl, xylyl, methylnaphthyl, phenylethylnaphthyl, alphahexylnaphthyl, dimethylbiphenyl, dipropylphenyl, etc., and halo-substituted groups, for example, chlorophenyl, bromophenyl, fluorophenyl, methylchlorophenyl, chloronaphthyl, etc.

The divalent aliphatic or aromatic organic group represented by R" are those divalent aliphatic or aromatic organic groups which are free of active hydrogen other than those of tht two attached hydroxyl groups in Formula II and are, for example, divalent aliphatic radicals containing at least carbon atoms such as, for example, ethylene, propylene, pentylene, hexylene, and the isomers of these divalent aliphatic radicals; the divalent aliphatic groups also include the polyoxyalkylene divalent radicals such as polyoxyethylene, polyoxypropylene, polyoxybutylene and the like. Also included by R" are those divalent radicals produced by the polymerization of butadiene, isoprene, etc. The aromatic organic groups represented by R" are, for example, m- and p-phenylene, tolylene, durylene, napthylene, xylylene, biphenylene, and the alkyl-substituted derivatives thereof containing up to 12 carbon atoms in the alkyl substituent.

The dihydroxy compounds of Formula II that are employed in the process of this invention are, for example, bisphenol-A, 4,4'-dihydroxybiphenyl, 4,4'-dihydroxy-3,3'-dimethylbiphenyl, 2,2 - bis(4-hydroxy - 3,5 - dimethylphenyl) propane, 4,4'-dihydroxy-3,3',5,5'-tetramethylbiphenyl, 4,4'-dihydroxy-3,3',5,5'-tetraphenylbiphenyl, 4,4'-dihydroxy(diphenyl ether), 4,4' - dihydroxydiphenylsulfone, 4,4' - dihydroxy(diphenyl sulfide), di(p - hydroxyphenyl) dimethylsilane, hydroquinone, resorcinol, 2,7-naphthalenediol, 1,6-naphthalenediol, 1,5-naphthalenediol, ethyleneglycol, propyleneglycol, butyleneglycol, hexyleneglycol, polyoxyethyleneglycol, polyoxypropyleneglycol, polyoxybutyleneglycol, alpha-, omega-, polybutadienediol, etc.

The hydroxy-terminated polyoxyalkylenes employed in the process of this invention are those having the general formula $$HO(C_eH_{2e}O)_pH$$

wherein $e$ is an integer of from 2 to 8 and $p$ is an integer of at least 2. These polyoxyalkylene compounds include hydroxy-terminated polyoxyethylenes $$HO(-C_2H_4O)_p-H$$

where $p$ is an integer of at least 2, hydroxy-terminated polyoxypropylenes $HO(C_3H_6-O)_q-H$, where $q$ is an integer of at least 2, hydroxy-terminated copolymers of polyoxyethylene and polyoxypropylene $HO(C_2H_4-O)_r(C_3H_6-O)_s-H$, where $r$ and $s$ are integers having a value of at least 1 and can be from 10 to 1,000 or more, etc.

The alkylene groups represented by R''' are, for example, methylene, ethylene, propylene, octylene, dodecylene and the isomers thereof. The arylene groups represented by R''' include, for example: $CH_2-C_6H_4OC_6H_4-$, phenylene, tolylene, diphenylene, $-C_6H_4-CH_2-C_6H_4-$, $-CH_2-C_6H_4-CH_2-$, etc. Arylene groups represented by R''' also include a group of compounds having the general formula $-C_6H_4-Y-C_6H_4-$ where Y is $-O-$, $-S-$, $-SO_2-$,

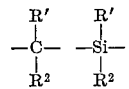

and $R_1$, $R_2$ are alkyl groups containing up to 6 carbon atoms.

The hydroxy-terminated polydienes employed in the process of this invention include linear polydienes and branched polydienes having the general formula:

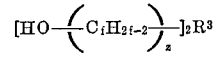

where $f$ is an integer of from 4 to 8, $z$ is an integer of at least one and can be as high as 1000, and $R^3$ is a divalent, alkyl or aryl radical. These hydroxy-terminated polydienes are well known in the art and are produced by the reaction of dilithioalkyl or dilithioaryl polymerized diene with hydrogen peroxide. Such dienes are, for example, butadiene, pentadiene, isoprene, etc.

The homopolymeric compositions and copolymeric compositions produced in accordance with the process of this invention find use as electrical insulation for wires, as dielectric materials in capacitor devices, as packaging films, etc. The homopolymers and copolymers of this invention which are liquids also find use as lubricants for metal to metal friction, as dielectric liquids for liquid capacitors, etc.

The following examples serve to further illustrate this invention. All parts are by weight unless otherwise expressly set forth.

EXAMPLE 1

Bisphenol A (1.1749 parts) and 2,6-lutidine (1.8 parts) were dissolved in 10.7 parts of anhydrous methylene chloride. Dichlorodiphenoxymethane (1.3201 parts) was added to the solution and the mixture stirred at room temperature for 2 hours and heated to reflux temperature with stirring for 10 minutes. The polymer was precipitated by the addition of the solution to methanol and was obtained in 96.8% yield. The polymer had an intrinsic viscosity [$\eta$] in benzene at 25° C. of 0.51 dl./g. The polymer was composed of recurring units of the following structure

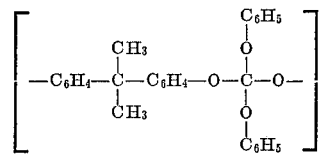

The polymer was soluble in benzene and a clear film cast from a benzene solution was shown to be non-crystalline and had a yield stress of 4500 p.s.i. and a modulous of 230,000 p.s.i. The polymer was stable for 20 hours in water at 100° C.

EXAMPLE 2

4,4'-dihydroxybiphenyl (6.338 parts) and tri-n-butylamine (15.6 parts) were dissolved in 80 parts of anhydrous methylene chloride. Dichlorodiphenoxymethane (9.347 parts) was added to above solution and the mixture stirred at room temperature for 18 hours. The polymer was precipitated by the addition of the solution to methanol and was obtained in 96.2% yield. The polymer was composed of recurring units of the structure

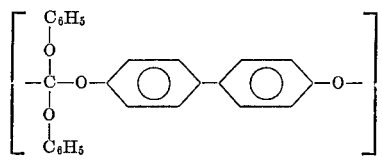

and had an intrinsic viscosity [$\eta$] in benzene at 25° C. of 0.17 dl./g.

EXAMPLE 3

4,4'-dihydroxy-3,3'-dimethylbiphenyl (6.444 parts) and 2,6-lutidine (9.42 parts) were dissolved in 80 parts of anhydrous methylene chloride. Dichlorodiphenoxymethane (8.260 parts) was added to the above solution maintained below −20° C. After the addition the mixture was stirred at room temperature for 3.5 hours and then at reflux temperature for 20 minutes. The polymer was precipitated in methanol, redissolved in 530 parts of methylene chloride and reprecipitated in ethanol. It was obtained in 90% yield. The polymer was composed of recurring units of the structure

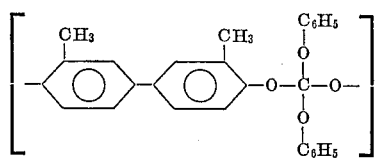

and had an intrinsic viscosity [η] in benzene at 25° C. of 0.7 dl./g.

EXAMPLE 4

4,4'-dihydroxy - 3,3',5,5' - tetramethylbiphenyl (8.012 parts) and 2,6-lutidine (11.3 parts) were dissolved in the 120 parts of anhydrous methylene chloride. Dichlorodiphenoxymethane (8.899 parts) was added to the above solution and the mixture stirred at room temperature for 20 hours. The polymer was precipitated by the addition of the solution to methanol (2000 parts) and was obtained in 96.7% yield. The polymer was composed of recurring units of the structure

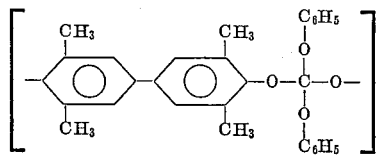

and had an intrinsic viscosity [η] in benzene at 25° C. of 0.16 dl./g.

EXAMPLE 5

4,4'-dihydroxy - 3,3',5,5' - tetraphenylbiphenyl (15.559 parts) and 2,6-lutidine (11.3 parts) were dissolved in the 107 parts of anhydrous methylene chloride. Dichlorodiphenoxymethane (8.536 parts) was added to the above solution and the mixture stirred at room temperature for 20 hours. The polymer was precipitated by the addition of the solution to methanol (2000 parts) and was obtained in 28% yield. The polymer was composed of recurring units of the structure

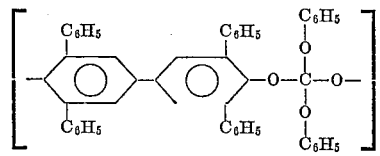

and was insoluble in benzene.

EXAMPLE 6

2,2-bis(4-hydroxy-3,5-dimethylphenyl)propane (1.5779 parts) and 2,6-lutidine (1.89 parts) were dissolved in the 13.4 parts of anhydrous methylene chloride. Dichlorodiphenoxymethane (1.4932 parts) was added to the above solution and the mixture stirred at room temperature for 72 hours. The polymer was precipitated by the addition of the solution to methanol (200 parts) and was obtained in 88.3% yield. The polymer was composed of recurring units of the structure

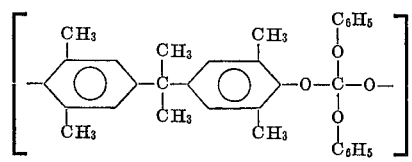

and had an intrinsic viscosity of [η] in benzene at 25° C. of 0.17 dl./g.

EXAMPLE 7

1,5-naphthalenediol (6.417 parts) and 2,6-lutidine (15.1 parts) were dissolved in the 134 parts of anhydrous methylene chloride. Dichlorodiphenoxymethane (10.783 parts) was added to the above solution and the mixture stirred at room temperature for 20 hours and then at reflux temperature for 20 minutes. The polymer was precipitated by the addition of the solution to methanol (3200 parts) and was obtained in 93.5% yield. The polymer was composed of recurring units of the structure

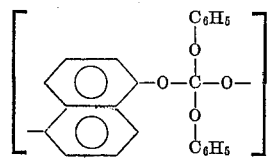

and was insoluble in benzene.

EXAMPLE 8

1,6-naphthalenediol (5.867 parts) and 2,6-lutidine (13.2 parts) were dissolved in the 107 parts of anhydrous methylene chloride. Dichlorodiphenoxymethane (9.858 parts) was added to the above solution and the mixture stirred at room temperature for 2.5 hours and then at reflux temperature for 20 minutes. The polymer was precipitated by the addition of the solution to methanol (1600 parts) and was obtained in 97.8% yield. The polymer was composed of recurring units of the structure

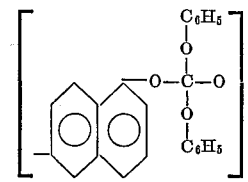

and had an intrinsic viscosity of [η] in benzene at 25° C. of 0.26 dl./g.

EXAMPLE 9

Hydroquinone (2.831 parts) and 2,6-lutidine (8.5 parts) were dissolved in the 80 parts of anhydrous methylene chloride and the solution cooled below −20°. Dichlorodiphenoxymethane (7.060 parts) was added to the above solution and the mixture stirred at room temperature for 72 hours. The reaction mixture was added to methanol (1600 parts) and the polymer was obtained by filtration in 98.0% yield. The polymer was composed of recurring units of the structure

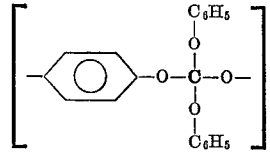

and was insoluble in benzene.

EXAMPLE 10

Resorcinol (2.568 parts) and 2,6-lutidine (8.5 parts) were dissolved in 80 parts of anhydrous methylene chloride. Dichlorodiphenoxymethane (6.405 parts) was added to the above solution and the mixture stirred at room temperature for 72 hours. The polymer was precipitated by the addition of the solution to methanol (1600 parts) and was obtained in 75.1% yield. The polymer was composed of recurring units of the structure

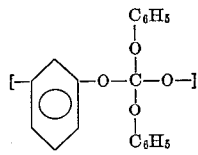

and had an intrinsic viscosity [$\eta$] in benzene at 25° C. of 0.10 dl./g.

EXAMPLE 11

2,7-naphthylenediol (5.396 parts) and 2,6-lutidine (11.3 parts) were dissolved in 107 parts of anhydrous methylene chloride. Dichlorodiphenoxymethane (9.066 parts) was added to the above solution and the mixture stirred at room temperature for 20 hours and then at reflux temperature for 10 minutes. The polymer was precipitated by the addition of the solution to methanol (1600 parts) and was obtained in 97.8% yield. The polymer was composed of recurring units of the structure

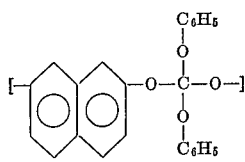

and had an intrinsic viscosity [$\eta$] in benzene at 25° C. of 0.17 dl./g.

EXAMPLE 12

A copolymer composed of units of the structure

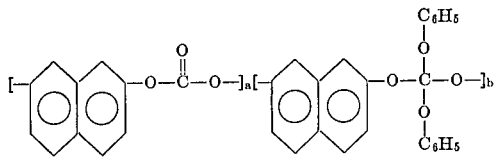

wherein $a$ and $b$ are integers greater than 1, can be produced by following the procedure of Example 11 and substituting phosgene (COCl$_2$) for up to 95% of the dichlorodiphenoxymethane employed in Example 11.

Other diacid halides of Formula V that can be substituted for up to 95% by weight of the dihalodiaryloxymethane of Formula I are, for example, oxalyl chloride, terephthalyl chloride, malonyl chloride, succinyl chloride, glutaryl chloride, adipyl chloride, isophthalyl chloride, phthalyl chloride, orthophenyldiacetyl chloride,

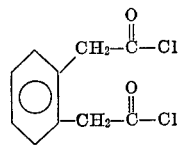

orthophenylacetyl propionyl chloride

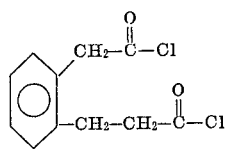

etc.

Where the polymer produced in accordance with the invention is insoluble in the normal solvents, films can be pressed from these materials by heating the material to temperatures below the decomposition temperature and under pressure, for example, from 500 to 5,000 p.s.i.g. These films are insulating films and can be employed as capacitor dielectrics.

What I claim as new and desire to secure by Letters Patent of the United States is:

1. A process for producing a polymer consisting essentially of from 10 to 10,000 chemically combined units of the formula,

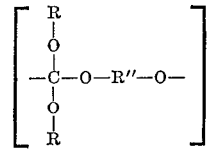

wherein R and R' are aryl groups selected from the class consisting of phenyl, naphthyl, biphenyl, and halo or alkyl substituted phenyl, naphthyl, or biphenyl groups wherein the alkyl group contains up to 12 carbon atoms and R'' is a divalent aliphatic group containing at least 2 carbon atoms or aromatic organic group which separates the oxygens by at least 3 carbon atoms, both groups being free of active hydrogens, which comprises forming a mixture of (1) a diaryloxydihalomethane having the formula,

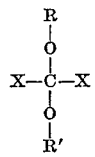

wherein R and R' are as above-defined and X is halogen selected from the class consisting of chlorine, bromine and iodine, (2) a dihydroxy compound of the formula,

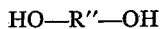

wherein R'' is as above-defined with the proviso that when R'' is an aromatic radical at least 3 carbon atoms separate the hydroxyl groups, and (3) a hydrogen halide acceptor, and maintaining said mixture at a temperature at which said dihalomethane and said dihydroxy compound react to produce said polymer.

2. The process as claimed in claim 1 which also contains a diacid halide of the formula

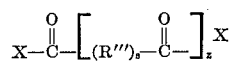

wherein X is a halogen selected from the class consisting of chlorine, bromine and iodine, R''' is an alkylene or arylene radical said alkylene radical containing from 1 to 10 carbon atoms, said arylene group containing from 6 to 12 carbon atoms, $s$ is an integer of 0 or 1, and $z$ is an integer of 0 or 1 and wherein a polymer having the formula

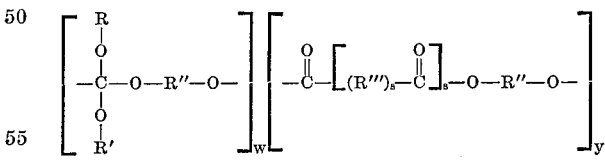

is formed, wherein R, R', R'', R''', $s$ and $z$ are as above-defined and $w$ and $y$ are integers greater than 1.

3. The process as in claim 1 wherein the dihalomethane is diphenoxydichloromethane.

4. The process as claimed in claim 3 wherein the dihydroxy compound is 2,2-di(4-hydroxyphenyl)propane.

5. The process as in claim 3 wherein the dihydroxy compound is 4,4'-dihydroxy-3,3'-dimethylbiphenyl.

6. A composition of matter selected from the class consisting of (a) homopolymers consisting essentially of from 10 to 10,000 chemically combined units of the formula,

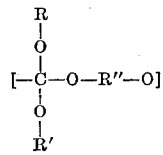

and (b) copolymers of the formula,

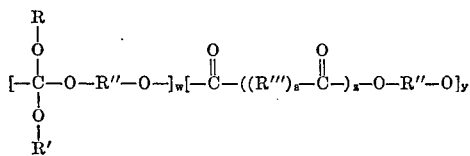

wherein R and R' are aryl groups selected from the class consisting of phenyl, naphthyl, biphenyl and the halo or alkyl-substituted phenyl, naphthyl, or biphenyl groups wherein the alkyl groups contain up to 12 carbon atoms, R" is a divalent aliphatic organic group containing at least 2 carbon atoms or a divalent aromatic organic group, both groups being free of active hydrogens other than those associated with the two hydroxyl groups attached thereto, with the proviso that when R" is an aromatic group the hydroxyl groups are separated by at least 3 carbon atoms, R'" is an alkylene or arylene group, $s$ in an integer of 0 or 1, $z$ is an integer of 0 or 1, $w$ and $y$ are integers greater than 1.

7. A composition as in claim 6 wherein R and R' are phenoxy groups and R" is a 4,4'-biphenylene group.

8. A composition as in claim 6 wherein R and R' are phenoxy groups and R" is a bis-2,2'(p-phenylene) propylidene group.

9. A composition as in claim 6 wherein R and R' are phenoxy groups and R" is a 4,4'-(3,3'-dimethyl)biphenylene group.

10. A composition as in claim 6 wherein R and R' are phenoxy groups and R" is a 4,4'-(3,3',5,5'-tetramethyl) biphenylene group.

References Cited

UNITED STATES PATENTS

| | | | |
|---|---|---|---|
| 2,057,676 | 10/1936 | De Witt | 260—61 |
| 2,060,715 | 11/1936 | Arvin | 260—61 |
| 3,076,784 | 2/1963 | Schulte-Huermann et al. | 260—61 |

SAMUEL H. BLECH, Primary Examiner

U.S. Cl. X.R.

117—232; 252—52, 64; 260—33.6, 47, 49, 613